United States Patent
Ravaioli et al.

[11] Patent Number: 6,024,002
[45] Date of Patent: Feb. 15, 2000

[54] BAR FEEDER WITH PRE-FEED DEVICE FOR AN AUTOMATIC LATHE

[75] Inventors: Silvano Ravaioli, Faenza; Francesco Cortecchia, Reda, both of Italy

[73] Assignee: Iemca Giuliani Macchine Italia SpA, Faenza, Italy

[21] Appl. No.: 09/250,255

[22] Filed: Feb. 16, 1999

[30] Foreign Application Priority Data

Mar. 5, 1998 [IT] Italy .................................. BO98A0131

[51] Int. Cl.⁷ .................................................. B23B 13/00
[52] U.S. Cl. .............................. 82/127; 82/126; 82/124; 414/18
[58] Field of Search .......................... 82/124, 125, 126, 82/127; 414/14, 18

[56] References Cited

U.S. PATENT DOCUMENTS

| | | | |
|---|---|---|---|
| 4,624,611 | 11/1986 | Fabbri | 82/2.5 |
| 4,638,693 | 1/1987 | Sugimoto | 82/2.5 |
| 4,977,801 | 12/1990 | Fabbri | 82/127 |
| 5,662,014 | 9/1997 | Link | 82/125 |
| 5,860,340 | 1/1999 | Cucchi | 82/126 |
| 5,881,617 | 3/1999 | Cucchi | 82/127 |

FOREIGN PATENT DOCUMENTS 0559094  9/1993  European Pat. Off. .

*Primary Examiner*—Andrea L. Pitts
*Assistant Examiner*—Henry W. H. Tsai
*Attorney, Agent, or Firm*—Guido Modiano; Albert Josif; Daniel J. O'Byrne

[57] ABSTRACT

A bar feeder for an automatic lathe provided with a carriage which feeds, by a certain extent, into the bar guiding channel the bar fed from a magazine before the bar is pushed towards the lathe by the bar pusher.

7 Claims, 3 Drawing Sheets

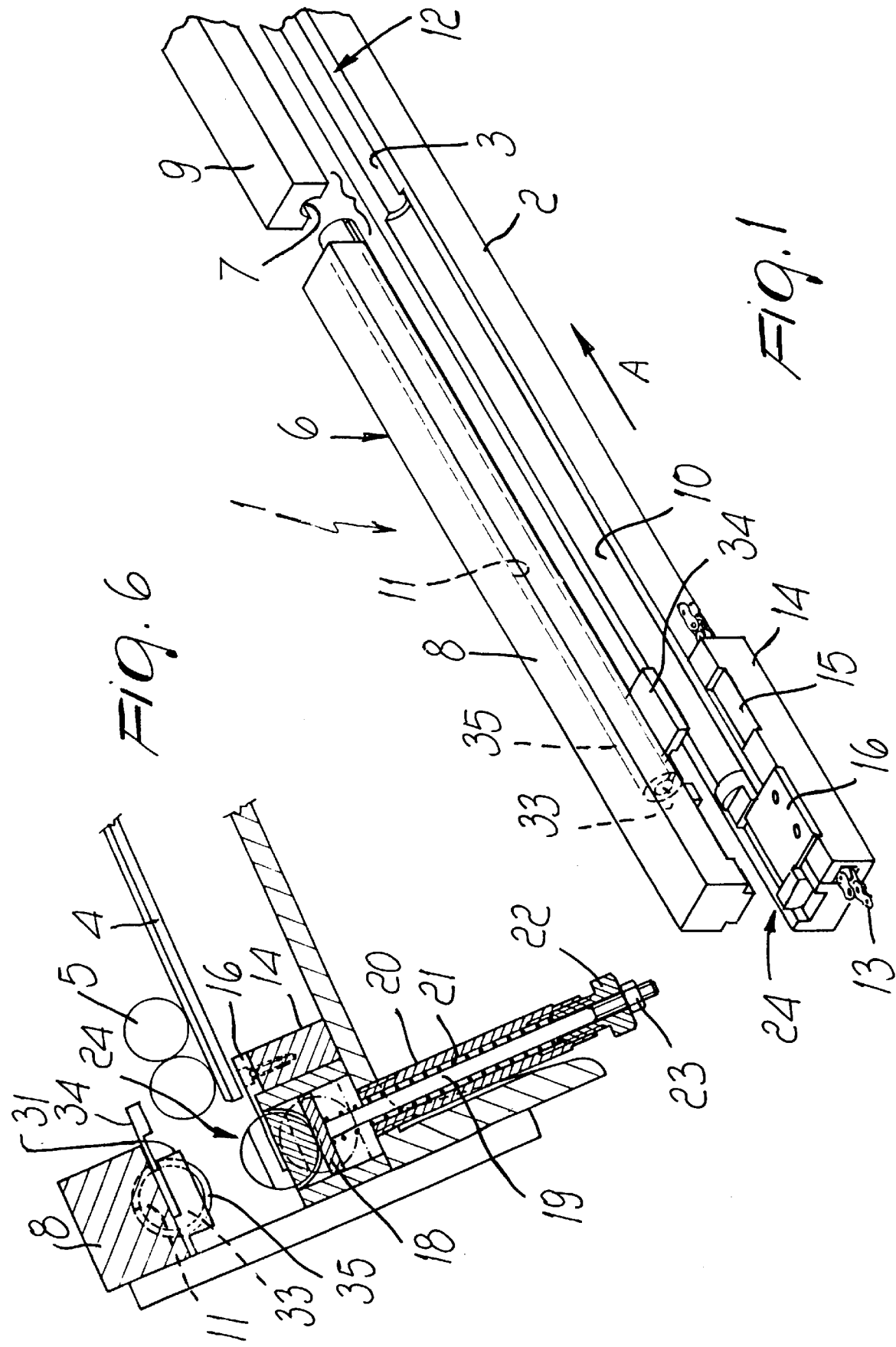

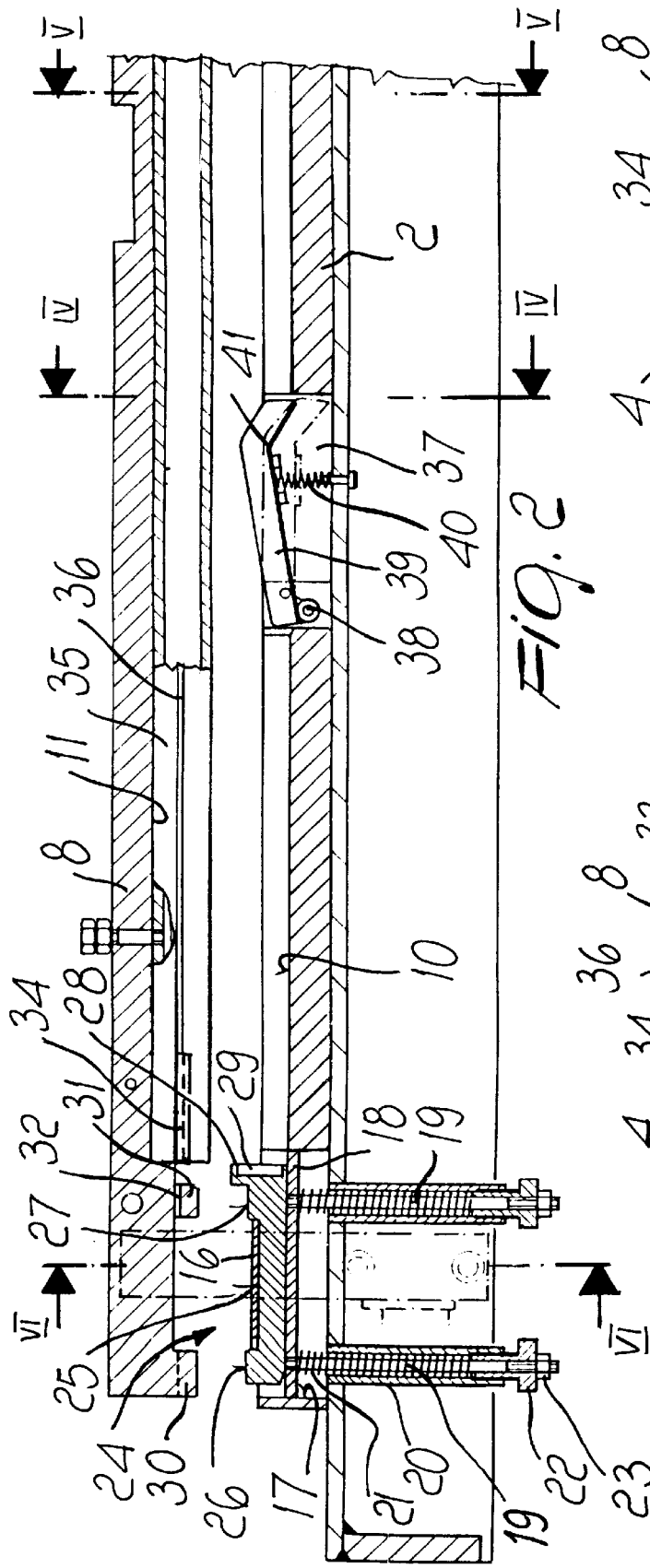
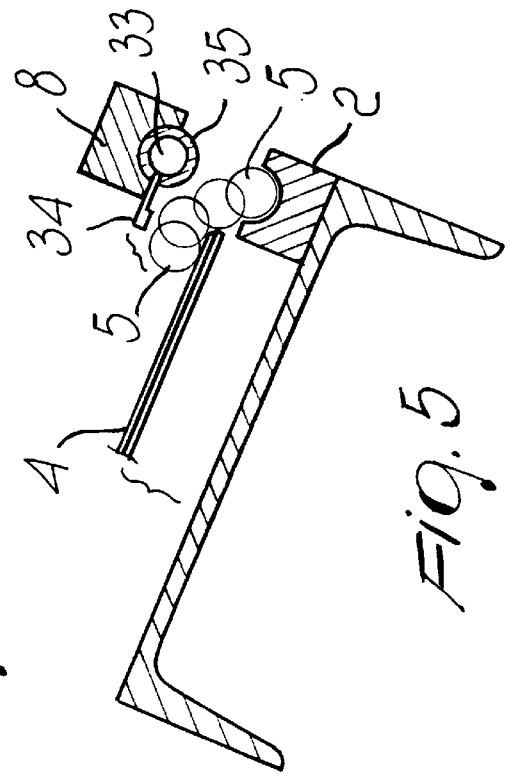
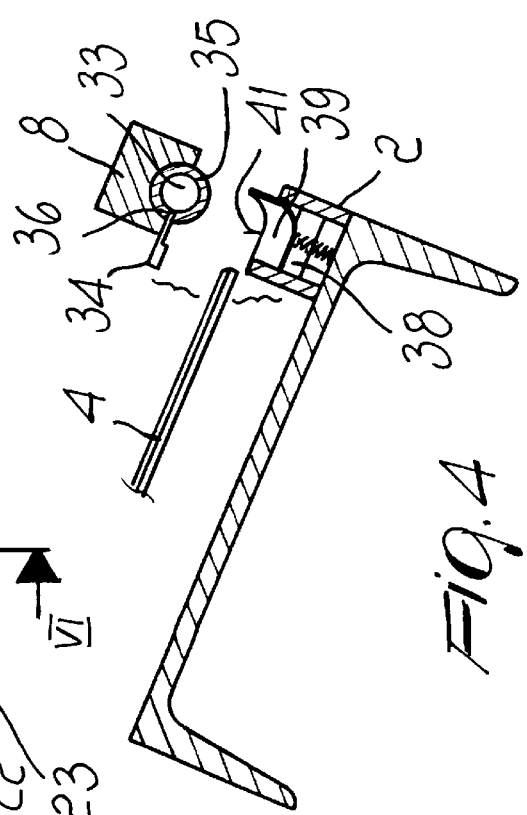

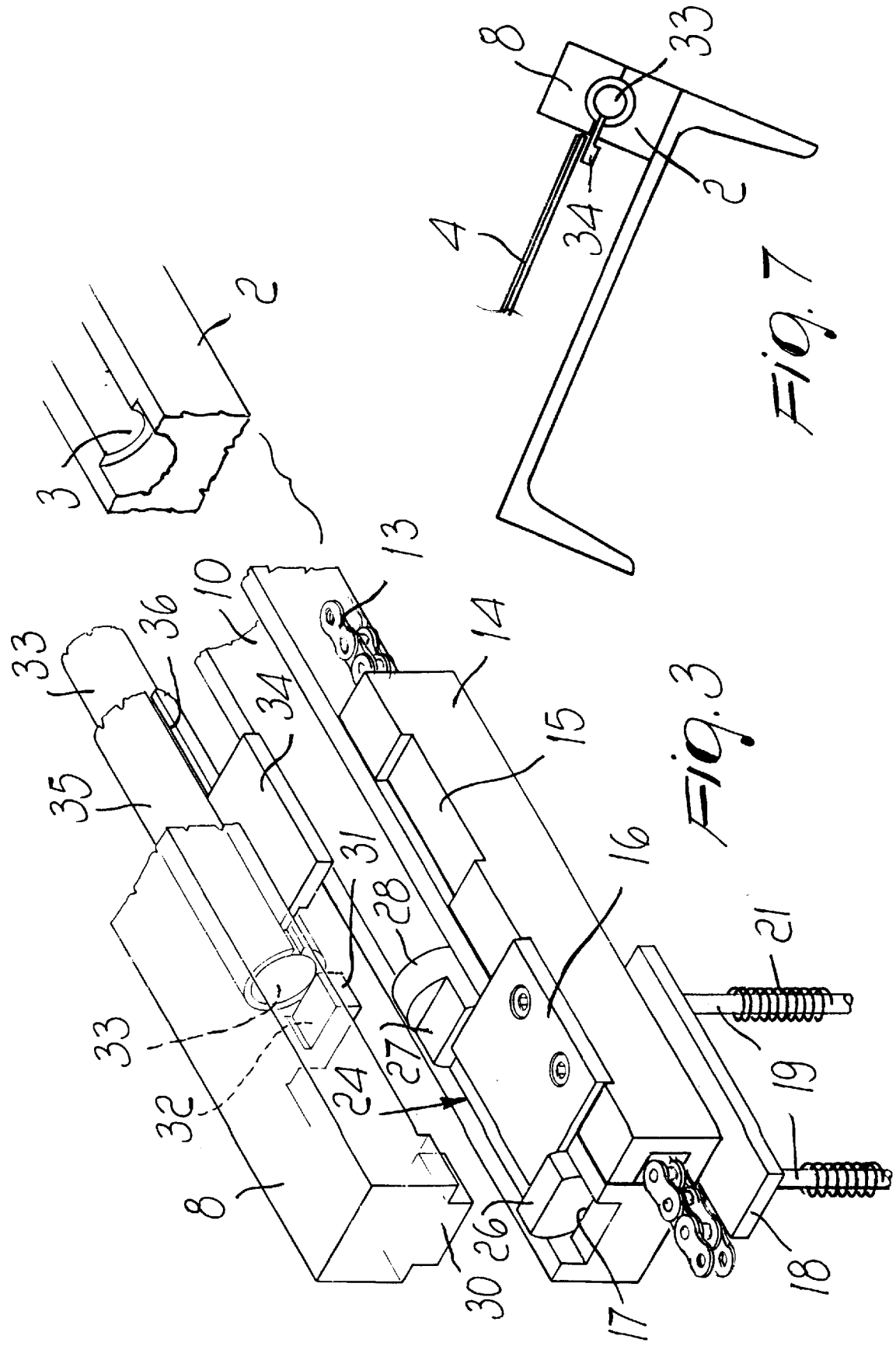

BAR FEEDER WITH PRE-FEED DEVICE FOR AN AUTOMATIC LATHE

BACKGROUND OF THE INVENTION

The present invention relates to a bar feeder with pre-feed device for an automatic lathe.

Feeders of the above type are already known. They comprise an elongated box-like body constituted by a lower tray and by a cover which can be lifted with respect to the lower tray. The tray and the cover respectively comprise mutually opposite slots which have a semicircular cross-section and which, when the cover is in the closed position, form a guiding channel in which a bar is deposited each time, said bar being pushed longitudinally by means of a bar pusher, in order to be inserted through a tubular spindle of a machine tool where the bar is machined section by section.

The bar pusher is supported so that it can slide within the cover, and in order to allow said pusher, when the cover closes, to be arranged behind the bar, said bar, before the cover closes, is fed forward by a suitable extent by means of a pre-feed device provided with an auxiliary pusher.

Such a device is disclosed for example in Italian utility model No. 195,220.

In conventional feeders, the pre-feed device comprises a carriage which is rigidly coupled to the motorization system and the auxiliary pusher has the same diameter as the bar pusher, since during the machining of the bar it must follow the bar pusher inside the guiding channel.

For small bars, in the order of 1–2 mm, the guiding channel is rather small and accordingly the front surface of the auxiliary pusher is rather limited. This circumstance, together with the fact that the guiding channel is employed for several bar diameters and that thin bars are also highly flexible, makes it very difficult to keep the auxiliary pusher in abutment against the bar. The bar, by flexing, tends in fact to disengage from the auxiliary pusher and to wedge between said auxiliary pusher and the wall of the guiding channel.

From a conceptual standpoint, it would be possible to increase the ability to pick up and push the bar by increasing the diameter of the auxiliary pusher, but this would also require an increase in the diameter of the guiding channel inside which the auxiliary pusher, by being rigidly coupled to the bar pusher, must move; as a consequence this creates once again conditions which facilitate the play of the bar inside the channel.

SUMMARY OF THE INVENTION

The aim of the present invention is to obviate the above-cited drawbacks of conventional feeders, i.e., to provide a feeder having a pre-feed device which is capable to correctly operate also with bars having a quite small diameter.

Within the scope of this aim, an object of the present invention is to provide a feeder which is structurally simple and therefore cheap as well as easy to provide in practice and safe and effective in operation.

This aim and this object are achieved by a bar feeder for an automatic lathe with a bar pre-feed device which comprises: a box-like body, which is composed of a lower horizontal tray and of a cover for closing said tray which can move between a raised position, in order to allow to receive in said tray a bar fed from a magazine, and a lowered position, in which said cover and said tray form a guiding channel for said bar which is connected to the outside by way of a longitudinal slit formed between said cover and said tray; an element for moving a slider which can slide parallel to said channel and externally thereto; a bar pusher, which is supported so that it can slide within said cover along an initial portion of said guiding channel and is provided with engagement means which, when said cover is in the closure position, are adapted to engage said slider through said longitudinal slit in order to move said bar pusher forward along said channel between a rearward stroke limit position and a forward position; a carriage being further provided which has an auxiliary pusher and is adapted to be moved by said slider, when the cover is open, between an initial position upstream of said bar pusher, at which said bar is fed from a magazine in front of said auxiliary pusher, and a final position downstream of said bar pusher; characterized in that said slider and said carriage comprise mutually engaging means for mutually engaging when said cover is raised and said carriage is in said initial position in order to allow to move the carriage and to pre-feed the bar along said channel, said engagement means being actuated by said cover so as to disengage when said carriage has returned to the initial position upstream of said bar pusher and said cover is in the closed position.

BRIEF DESCRIPTION OF THE DRAWINGS

Further characteristics and advantages of the present invention will become apparent from the following detailed description of an embodiment illustrated only by way of non-limitative example in the accompanying drawings, wherein:

FIG. 1 is a partially schematic perspective view of a feeder according to the invention;

FIG. 2 is a longitudinal sectional view of the end of the feeder that lies furthest from the end associated with the lathe;

FIG. 3 is a partially exploded perspective view of the end shown in FIG. 2;

FIG. 4 is a sectional view, taken along the plane IV—IV of FIG. 2;

FIG. 5 is a sectional view, taken along the plane V—V of FIG. 2;

FIG. 6 is a sectional view, taken along the plane VI—VI of FIG. 2;

FIG. 7 is a sectional view, similar to FIG. 4, but with the cover in the closed position.

DESCRIPTION OF THE PREFERRED EMBODIMENTS

With reference to the above Figures, the feeder is generally designated by the reference numeral 1 and comprises a lower tray 2 which lies horizontally and is longitudinally aligned with the axis of the lathe with which the feeder is associated.

The tray 2 has a slot 3 which has a circular cross-section and is open in an upward region; an inclined plane 4 leads into said slot and acts as a magazine for the bars 5 to be fed to the lathe. The bars 5 are deposited in the slot 3 by a bar picker, not shown, which releases the lowermost bar among those rested on the plane 4 while retaining the remaining bars.

A cover 6 can be placed over the tray 2 and has a slot 7 having a semicircular cross-section.

The cover 6 is constituted by two parts 8 and 9 which are actuated by way of actuation means, not shown, between a raised position, at which a bar 5 to be fed is deposited in the groove or slot 3, and a closed position, at which the slots 3 and 7 form a channel having a circular cross-section for guiding the bar during the forward feed stroke towards the lathe.

The part 8 is located at the opposite end of the cover with respect to the end leading into the lathe; at said part 8 the slots 3 and 7 have a larger diameter than the remaining portion that lies at the part 9. For the sake of clarity and in order to better differentiate the slots having a larger diameter from the remaining ones, in the continuation of the description the reference numerals 10 and 11 illustrate the larger-diameter slots that lie at the part 8.

A longitudinal lateral slit 12 remains between the parts 8 and 9 of the cover 6 and of the tray 2, on the side of the inclined plane 4, and runs along the entire length of the feeder (see FIG. 7) and becomes smaller, without ever closing, also when the cover 6 is in the closed position, i.e., rested on the tray 2.

When the cover 6 is in the closed position, between the parts 8 and 9 and the lower tray 2 a lateral slit 12 remains which runs along the entire length of the feeder.

Laterally to the feeder, on the side of the slit 12, there is the element meant to feed the bar that is fed into the guiding channel. Said element comprises a chain 13 which is parallel to the guiding channel and is actuated by a gearmotor which is not shown.

A slider 14 is rigidly coupled to the chain 13, can slide on adapted guides, and has, in an upward region, a depression 15 which is open upward. A strip 16 is fixed upstream of the depression 15 and is constituted by a plate which protrudes into the guiding channel through the longitudinal slit 12. Accordingly, when the slider 14 is actuated along the bar feed direction A, the strip 16 moves along the slit 12.

In the lower tray 2, at the end of said tray that lies furthest from the lathe, there is a rectangular seat 17 which leads into the slot 10 and accommodates a plate 18. The plate 18 is fixed to the top of a pair of parallel stems 19 which are guided through respective sleeves 20 lying below the tray 2 and forming, together with said sleeves 20, respective tubular interspaces in which springs 21 are accommodated.

The stems 19 are guided in bushes 22 which are inserted in the lower ends of the sleeves 20 and act as an abutment for nuts 23 which are screwed on the ends of the stems that protrude from the sleeves 20. When the cover 6 is open, the springs 21, by abutting against the bushes 22, keep the upper face of the plate 18 co-planar to the bottom of the slot 10. This planar condition can be adjusted by acting on the nuts 23.

A carriage 24 can be arranged on the plate 18; its function is to pre-feed the bar along the guiding channel. The carriage 24 is constituted, in practice, by a cylindrical body provided, in an upward region, with a depression 25 which is surmounted, upstream and downstream with respect to the feed direction A, by a rear flat region 26 and by a front flat region 27. The front flat region 27 forms a sort of disk 28 which is affected at the front by a cavity 29 and constitutes the element that is meant to make contact with the bar in order to act as an auxiliary pusher.

When the part 8 of the cover 6 is raised with respect to the tray 2, the depression 25 is at the level of the strip 16 and accordingly, by means of the motorization system of the chain, it can be moved in the direction A in order to act on the bar and push it towards the lathe. Viceversa, when the part 8 of the cover 6 is lowered, the carriage 24 is lowered in order to be accommodated in the seat 17.

In order to lower the carriage 24 into the seat 17, in the slot 11 of the part 8 of the cover 6 two protrusions 30 and 31 are provided which protrude into the slot 11 and act on the flat regions 26 and 27. The protrusion 31, on the side directed towards the slit 12, has a notch 32 which allows the strip 16 to pass when the part 8 of the cover is closed, i.e., lowered onto the tray 2.

Downstream of the protrusion 31 a bar pusher 33 is provided, which is meant to complete the feeding of the bar towards the lathe.

The bar pusher 33 is constituted in practice by a rod which has a cross-section adapted to enter the guiding channel formed by the slots 3 and 7 and has, at its rear end, a strip 34 which is adapted to engage in the depression 15 of the slider 14, as will become apparent hereinafter, and has, at its front region, a retaining collet (not shown) in which the rear end of the bar to be fed is retained.

The bar pusher 33, during the pre-feed of the bar, is accommodated in a cylindrical sleeve 35 whose outside diameter is equal to the diameter of the channel formed by the slots 10 and 11 and whose inside diameter is equal to the diameter of the channel formed by the slots 3 and 7. The sleeve 35 has, on the side of the slit 12, a slit 36 which has the same height and faces the slit 12 when the cover 6 is closed.

A depression 37 is formed in the slot 10, downstream of the seat 17 and at a certain distance from it, and a lifting element is articulated in said depression by means of a pivot 38; said lifting element is adapted to lift the end of the bar from the bottom of the slot 10. Said element is constituted by a tab 39 which is folded at an angle and has a portion which is adjacent to the articulation pivot 38 having the same concavity as the slot 10. The tab 39, by means of an underlying spring 40, is actuated upwards so as to form a crest 41 which protrudes from the bottom of the slot 10.

Operation of the described feeder is as follows.

It is assumed that the feeder is in the condition in which the parts 8 and 9 that compose the cover 6 are raised with respect to the lower tray 2 (FIGS. 1–6). The slider 14 is in a rearward position and the strip 16 engages the depression 25 of the carriage 24, the strip 16 and the depression 25 acting thus as coupling means. The bar pusher 33 is arranged inside the sleeve 35 and therefore the strap 34 is raised with respect to the slider, disengaged with respect to the depression 15.

With the feeder in the above-described conditions, by means of the bar picker a bar 5 is fed into the slot 10, 3 of the lower tray 2 (FIG. 5). The rear end of the bar, by being arranged above the crest 41 of the tab 39, is raised from the bottom of the slot 10 so as to be aligned with the auxiliary pusher 28 of the carriage 24.

At this point the chain 13 is actuated and, by means of the strip 16 operating as a movement element which engages the depression 25, moves the carriage 24 forward. The advancement of the carriage 24 initially causes the abutment of the auxiliary pusher 28 against the rear end of the bar 5 and the consequent feed of said bar towards the lathe. It should be observed that when the carriage is superimposed on the tab 39, said tab is forced to retract into the seat 37 of the strip 16, which keeps the carriage 24 pressed downwards.

Once the carriage 24 has arrived proximate to the inlet of the channel formed by the slots 3 and 7, so that the bar has entered said channel and its rear end lies downstream of the front end of the bar pusher 33, the return stroke of the carriage 24 is actuated; at the end of said stroke, the carriage is arranged above the plate 18 (FIG. 2). Then the part 8 of the cover 6 is lowered onto the lower tray, so as to close the channel formed by the slots 10 and 11 (FIG. 7). The descent of the part 8 causes, due to the pressure applied by the protrusions 30 and 31 on the flat regions 26 and 27, the insertion of the carriage 24 in the seat 17 and the disengagement of the strip 16 from the depression 25. At the same time, the strip 34 of the bar pusher 33 engages the depression 15 of the slider 14. In practice the engagement of the slider 14 is transferred from the carriage 24 to the bar pusher 33.

Through the actuation of the chain in the feed direction A, the bar pusher 33 pushes the bar 5 further along the guiding channel 3 and 7 according to the strokes determined by the lathe.

It should be observed that when the part 8 of the cover 6 closes, the strip 16, which is rigidly coupled to the slider, is aligned with the slit 36 and, after disengaging from the carriage 24, can pass therethrough during the feed stroke of the bar pusher.

Once the lathe has completed the machining of the bar, the bar pusher is made to retract and the cover is opened to insert a new bar. The operating cycle for the feeding of the new bar is then repeated as described above.

It is evident that the invention perfectly achieves the intended aim and object. It is particularly important that the auxiliary pusher 28, by being disengageable from the bar pusher and therefore being no longer forced to enter the guiding channel formed by the slots 3 and 7, can be significantly larger and can therefore better pick up the bar during the pre-feed step. In this manner, in addition to the fact that the end of the bar is arranged by the tab 39 so as to engage the cavity 29 of the auxiliary pusher 28, the bar is prevented from sliding laterally and jamming between the auxiliary pusher and the wall of the guiding channel.

The described feeder is susceptible of numerous modifications and variations. In particular, instead of a single element for moving the carriage 24 and the slider 14 it is possible to provide two separate chains, one of which moves the pre-feed carriage 24 while the other one moves the bar pusher 33.

In another embodiment of the described feeder, in order to engage the rear end of the bar in the cavity of the auxiliary pusher, the slot 10 has, downstream of the carriage 24, a depression into which the auxiliary pusher can descend. The carriage 24 is of course configured so that it can move downwards at the front in order to engage the auxiliary pusher in said depression.

The disclosures in Italian Patent Application No. BO98A000131 from which this application claims priority are incorporated herein by reference.

What is claimed is:

1. A bar feeder with a bar pre-feed device for an automatic lathe comprising: a box-like body, including a lower horizontal tray and a cover for closing said tray, said cover being movable between a raised position, in which a bar to be fed to the lathe is deposited in said tray, and a lowered position, in which said cover and said tray form a guiding channel for said bar; a longitudinal slit formed between said cover and said tray and communicating with said guiding channel so as to allow passage of a said bar; a slider which is slidable parallel to said guiding channel and externally thereto; a driving element for driving said slider; a bar pusher, which is supported so as to be slidable within said cover along an initial portion of said guiding channel, said bar pusher being provided with engagement means for engaging said slider, when said cover is in a closure position, through said longitudinal slit, whereby to move said bar pusher forward along said guiding channel between a rearward stroke limit position and a forward position; a carriage being provided with an auxiliary pusher, said carriage being actuatable by said slider, when said cover is open, for moving between an initial position upstream of said bar pusher, at which said bar to be fed is received in said tray, in front of said auxiliary pusher, and a final position downstream of said bar pusher; and coupling means, provided at said slider and said carriage respectively, for engaging each other when said cover is raised and said carriage is in said initial position, and moving the carriage and pre-feed the bar along said channel, and wherein said coupling means are actuatable by said cover so as to disengage from each other upon return of said carriage to the initial position upstream of said bar pusher and of said cover in the closure position.

2. The feeder of claim 1, wherein said cover comprises a closure part for closing the guiding channel at a first end thereof being opposite with respect to a second end which is associated with the lathe, and wherein said slider has a strip which protrudes inside said guiding channel, said strip being adapted to engage said carriage when said closure part of the cover is in an open position, said closure part of the cover being further provided with moving means for moving said carriage into a position for disengaging from said strip, upon actuation of said closure part into a closed position.

3. The feeder of claim 2, wherein said closure part comprises engagement protrusions and wherein said carriage has a substantially cylindrical body, said cylindrical body comprising, in an upward region thereof, a depression, said depression being engageable by said strip of the slider in the open position of said closure part, and flat regions which are formed upstream and respectively downstream of said depression and on which said engagement protrusions of said closure part engage, said depression and strip constituting said coupling means, and wherein the feeder further comprises: a seat formed at a bottom part of said guiding channel, in said tray; elastic means acting at said seat; and a plate being guidingly movable, under action of said elastic means within said seat, up to a position in which the plate is co-planar with said bottom part, said carriage in said initial position, resting on said plate, and said seat being adapted to accommodate said body when said engagement protrusions engage said flat regions so as to cause disengagement of said strip from said depression during closing of said closure part of the cover and advancement of the bar pusher.

4. The feeder of claim 3, wherein said guiding channel is formed in a first part thereof by slots formed at said closure part of the cover and at a corresponding portion of the tray, said first part of the guiding channel being larger in cross-section than a second remaining portion thereof which is arranged at a side of the feeder being directed towards the lathe.

5. The feeder of claim 4, wherein said cylindrical body is provided, in a front region thereof, with a disk-like auxiliary pusher, said pusher having formed therein a cavity which is adapted to be engaged by an end of said bar to be fed.

6. The feeder of claim 5, comprising downstream of said seat formed in said tray a depression; a lifting element which is articulated in said depression, said lifting element being constitutes by a tab; and a spring for actuating said tab, so as to protrude from a bottom part of said slot and arrange an end of the bar to be fed at such a level so as to enable the bar end to engage said cavity during advancement of the carriage.

7. A bar feeder with a bar pre-feed device for an automatic lathe, comprising: a box-like body, which is composed of a lower horizontal tray and of a cover for closing said tray, said cover being movable between a raised position, in which a bar to be fed to the lathe is received in said tray, and a lowered position, in which said cover and said tray form a guiding channel for said bar, a longitudinal slit formed between said cover and said tray and communicating with said guiding channel so as to allow passage of a said bar; a slider which is slidable parallel to said channel and externally thereto; a driving element for driving said slider; a bar pusher, which is slidingly supported in said cover along an initial portion of said guiding channel, said bar pusher being provided with engagement means which, in the closed position of said cover, are adapted to engage said slider through said longitudinal slit in order to produce the advancement of said bar pusher along said channel between a rearward stroke limit position and a forward position; a carriage provided with an auxiliary pusher, said carriage being movable in an open condition of the cover, between an initial position upstream of said bar pusher when a said bar is received in said tray, in front of said auxiliary pusher, and a final position downstream of said bar pusher; and a movement element, being separate from the driving element of the slider, and engaging said carriage when said cover is raised and said carriage is in said initial position, for movement of the carriage and pre-feed of a said bar along said channel until said bar is located downstream of said bar pusher, and for further causing return of the carriage to the initial position upstream of said bar pusher.

* * * * *